(12) United States Patent
Mader

(10) Patent No.: US 11,246,449 B2
(45) Date of Patent: Feb. 15, 2022

(54) ATTACHMENT FOR A SERVING VESSEL

(71) Applicant: ZWILLING J.A. HENCKELS AG, Solingen (DE)

(72) Inventor: Sebastian Mader, Hilden (DE)

(73) Assignee: ZWILLING J.A. HENCKELS AG, Solingen (DE)

( * ) Notice: Subject to any disclaimer, the term of this patent is extended or adjusted under 35 U.S.C. 154(b) by 146 days.

(21) Appl. No.: 16/343,263

(22) PCT Filed: Jan. 10, 2018

(86) PCT No.: PCT/EP2018/000013
§ 371 (c)(1),
(2) Date: Jun. 17, 2019

(87) PCT Pub. No.: WO2018/134035
PCT Pub. Date: Jul. 26, 2018

(65) Prior Publication Data
US 2019/0328174 A1   Oct. 31, 2019

(30) Foreign Application Priority Data
Jan. 20, 2017  (DE) ...................... 10 2017 000 499.4

(51) Int. Cl.
*A47J 36/12*  (2006.01)

(52) U.S. Cl.
CPC ..................... *A47J 36/12* (2013.01)

(58) Field of Classification Search
CPC .... A47J 36/12; A47J 27/0804; A47J 27/0806; A47J 27/0808; A47J 27/0811; A47J 36/10; A47J 36/16; A47J 27/00; A47J 43/287

USPC ......................................................... 220/744
See application file for complete search history.

(56) References Cited

U.S. PATENT DOCUMENTS

| | | | |
|---|---|---|---|
| 498,020 A * | 5/1893 | Murray | B65D 55/16 220/379 |
| 1,390,766 A | 9/1921 | Cunningham | |
| 1,745,548 A | 2/1930 | Lerner | |
| 1,755,918 A * | 4/1930 | Fagley | A47J 36/16 99/340 |
| 2,259,770 A * | 10/1941 | Nove | A47J 36/12 220/379 |
| 2,541,604 A * | 2/1951 | Normandin | A47J 36/12 220/744 |
| 2,808,175 A * | 10/1957 | Aiken | A47J 36/10 220/379 |

(Continued)

FOREIGN PATENT DOCUMENTS

| | | |
|---|---|---|
| DE | 9012852 U | 12/1990 |
| DE | 91099055 U | 3/1992 |

(Continued)

*Primary Examiner* — Ernesto A Grano
(74) *Attorney, Agent, or Firm* — Andrew Wilford

(57) ABSTRACT

The invention relates to a holder for the lid (7) of a pot-type or dish-type serving vessel (1) such as a cooking vessel, the holder being used to hold the lid on the serving vessel in an upright position after the lid has been removed. The holder is characterised by an attachment in the form of a ring (2) which can be attached to the upper rim of the serving vessel and which has a ring opening (5) that can be sealed using the loose, free lid (7), wherein the ring (2) has at least one support (10) forming stops and being used to hold the lid (7) in an upright position on the ring.

9 Claims, 1 Drawing Sheet

(56) References Cited

U.S. PATENT DOCUMENTS

| | | | | |
|---|---|---|---|---|
| 2,833,319 | A * | 5/1958 | Justus | A47J 43/00 |
| | | | | 141/364 |
| 3,028,972 | A * | 4/1962 | Guillaumant | A47J 43/287 |
| | | | | 211/41.11 |
| 4,005,798 | A * | 2/1977 | Minsky | A47J 36/12 |
| | | | | 220/379 |
| 4,592,483 | A * | 6/1986 | Scouten | B65D 39/00 |
| | | | | 220/379 |
| 5,683,010 | A * | 11/1997 | Boyajian, Jr. | A47J 36/12 |
| | | | | 220/744 |
| 5,730,045 | A * | 3/1998 | Delaquis | A47J 36/08 |
| | | | | 99/337 |
| 6,234,067 | B1 * | 5/2001 | Schmidt | A47J 36/12 |
| | | | | 126/275 R |
| 7,025,312 | B1 * | 4/2006 | Dare | A47J 47/16 |
| | | | | 211/41.2 |
| 7,878,110 | B1 * | 2/2011 | Michnik | A47J 36/08 |
| | | | | 99/410 |
| 8,740,159 | B2 | 6/2014 | Braun | |
| 8,833,569 | B2 * | 9/2014 | Clarkson | A47B 81/04 |
| | | | | 211/41.11 |
| D908,439 | S * | 1/2021 | Rajasekaran | D7/601 |
| 2004/0216620 | A1 * | 11/2004 | Quiggins | A47J 36/08 |
| | | | | 99/413 |
| 2005/0084580 | A1 * | 4/2005 | Jones | A47G 21/145 |
| | | | | 426/520 |
| 2011/0260023 | A1 * | 10/2011 | Braun | A47J 43/287 |
| | | | | 248/220.21 |
| 2012/0235003 | A1 * | 9/2012 | Turbes | A47J 36/12 |
| | | | | 248/309.1 |
| 2014/0008315 | A1 * | 1/2014 | Elly | A47J 36/12 |
| | | | | 211/41.11 |
| 2016/0374506 | A1 * | 12/2016 | Bui | A47J 36/12 |
| | | | | 220/744 |
| 2017/0188749 | A1 * | 7/2017 | Prandelli | A47J 27/0804 |
| 2018/0296040 | A1 * | 10/2018 | Au | A47J 43/287 |
| 2019/0029465 | A1 * | 1/2019 | Camden | A47J 36/12 |
| 2019/0110637 | A1 * | 4/2019 | Groll | A47J 36/12 |
| 2019/0344608 | A1 * | 11/2019 | Baker | A46B 17/02 |
| 2021/0030198 | A1 * | 2/2021 | Rajasekaran | A47J 36/12 |

FOREIGN PATENT DOCUMENTS

| | | |
|---|---|---|
| JP | 54/128760 U | 2/1953 |
| JP | 48/008550 U | 6/1971 |
| JP | S4888550 U | 1/1973 |
| JP | 54128760 U | 9/1979 |
| JP | 60/161060 U | 10/1985 |
| JP | S60161060 U | 10/1985 |
| JP | 11/259 A | 1/1999 |
| JP | 11000259 A | 1/1999 |
| KR | 101403647 B | 6/2014 |

* cited by examiner

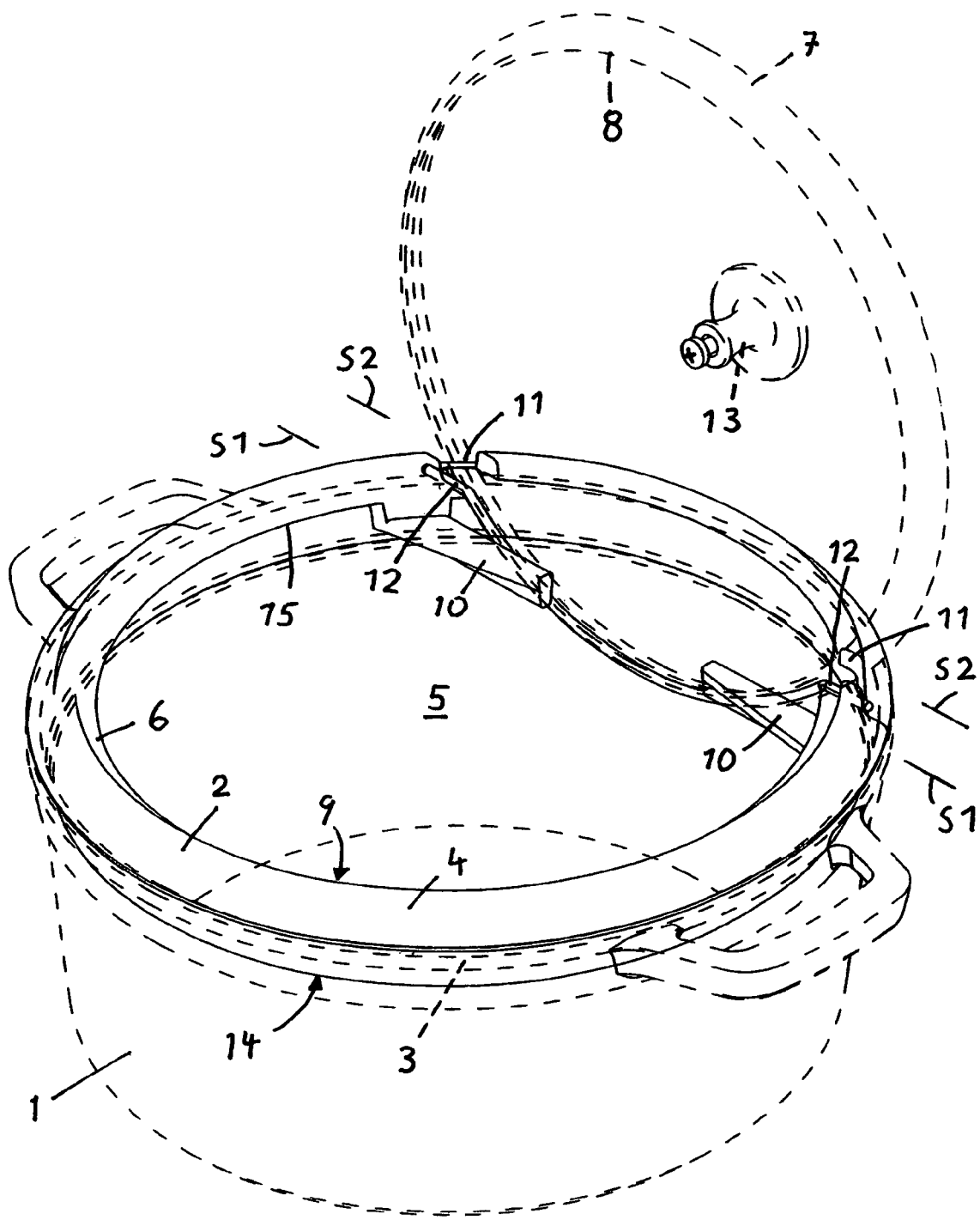

ATTACHMENT FOR A SERVING VESSEL

CROSS REFERENCE TO RELATED APPLICATIONS

This application is the US-national stage of PCT application PCT/EP2018/000013 filed 10 Jan. 2018 and claiming the priority of German patent application 102017000499.4 itself filed 20 Jan. 2017.

FIELD OF THE INVENTION

The invention relates to a holder for the lid of a pot- or dish-type serving vessel, such as a cook pot or dish, the holder being used to hold the lid on the serving vessel in an upright position after the lid has been removed.

BACKGROUND OF THE INVENTION

In the food service industry, it is known to set up pot-type serving vessels having a lid so that a guest can remove food from the vessel. In order to keep the lid of the vessel secure after it has been removed, it is known to articulate the lid on the vessel or, in the case of an unconnected free lid, to provide the vessel with a device that receives the lid. For instance, a wire frame fixed to the vessel is known from DE 9109055 in which the lid is held in an upright position. Furthermore, it is known from KR 101403647 to make a recess in the upper edge of a cooking pot into which a projection of the lid can be inserted. Both solutions require a structural alteration of the vessel.

OBJECT OF THE INVENTION

It is the object of the invention to provide a holder for the lid of a serving vessel that can securely hold the vessel lid in an upright position without having to alter the serving vessel structurally, thus enabling commercially available serving vessels, particularly cooking pots, to be used.

SUMMARY OF THE INVENTION

This object is achieved according to the invention by an attachment in the form of a ring that can be set on the upper edge of the serving vessel whose opening can be closed by the loose, free lid, the ring having at least one stop-forming support that can hold the lid on the ring in an upright position.

Such an attachment can be used on a wide variety of commercially available cook pots or dishes without the need to adapt them structurally. Neither a hinge nor any other elaborate additional construction on the serving vessel is required. Tilt-proof positioning of the lid in its upright position is achieved with a lid having a simple construction that is easy to clean and handle.

A ring between a cooking pot and a pot lid is inherently known from DE 9012852. That is not a serving vessel, however, and there is no support for the lid in an upright position.

It is advantageously proposed that, when in its upright position, the lid projects with a lower part of its outer edge into the ring opening. In addition, when in its upright position, the lid can project with part of its lower edge into an interior of the serving vessel. On one hand, this results in space-saving storage of the lid in its upright position; on the other hand, this ensures that condensate formed on the lower side of the lid drips safely into an interior of the vessel.

The lid is held particularly securely if the stop-forming support of the ring has at least one projection that extends into the ring opening as an inner stop behind which the part of its lower edge of the lid is held. In this case, one such projection can be at each of two respective spaced-apart points as an inner stop on the inner edge face of the ring. It is also advantageous if the projection/projections on the inner edge face of the ring is/are integrally formed on the ring.

An additional improvement of the hold on the lid is achieved if the ring has two spaced-apart notches on the inner and upper edges in which the lid rests with its edge when in the upright position. The lid can have two projections that extend outward and rest in the notches both when the lid is in the closed position and when it is in the upright position. This allows for one-handed operation, since the projections with the notches have a function similar to that of a hinge. It is also advantageous to this end if the projections are formed by a metal or plastic wire that is fastened to, particularly welded or integrally formed on, the lid.

Positive guidance of the lid when it is being removed to the effect that the edge of the lid drops into the notches can also be achieved by providing at least one projection that extends into the ring opening as an outer stop.

It is advantageously proposed that the lower edge of the ring have a lower-edge shape complementary to the upper edge of the serving vessel, and that an upper edge of the ring has an upper-edge shape that is complementary to the edge of the lid.

Handling is made even easier if a handle is provided off-center on an upper side of the lid. Furthermore, it is proposed that at least one radially aligned recess, particularly a groove, be provided in the upper edge of the ring as a holder for cooking tools.

BRIEF DESCRIPTION OF THE DRAWING

An embodiment of the invention is shown in a perspective view in the drawing and will be described in further detail in the following.

SPECIFIC DESCRIPTION OF THE INVENTION

Commercially available cookware 1 is to be used as a serving vessel having a lid 7. To this end, the cookware, particularly a cooking pot, carries an attachment in the form of a ring (ring member) 2 that covers the upper edge 3 of the cookware 1, the lower edge 14 of the ring having a lower-edge shape complementary to the upper edge of the serving vessel, and the upper edge 4 of the ring has an upper-edge shape complementary to the edge of the lid. The lower edge 14 of the ring is formed here such that it covers the upper edge 3 of the cookware with its U- or L-shaped cross section, so that the ring 2 is held securely on the cookware 1. The ring 2 is preferably made of metal or plastic.

The upper edge 4 of the ring 2 has a stepped inner edge face 6 that annularly surrounds the ring opening 5 in which the outer edge 8 of the lid 7 rests when the lid closes the ring opening 5.

Two elongated, stop-forming projections 10 are formed are integrally formed as fixed supports on the inner edge 9 of the ring 2 that are aligned on a secant S1 to the inner circle 15 of the ring 2. The secant S1 is spaced radially substantially outward from the center of the circle. The lid 7 is placed in the upright position behind these two projections 10, so that the lid rests with a lower part of its outer edge 8 behind the two projections 10.

In this upright position, the outer edge 8 also lies in two elongated notches 11 formed in the upper edge 4 of the ring. The two notches 11 lie on a second secant S2 that extending parallel to the above-described first secant S1 and has a greater spacing from the center of the ring 2 than the spacing of the first secant S1 from the ring center.

As a support, the two stop-forming projections 10 and the two stop-forming notches 11 form a sufficiently tilt-proof holder for the lid 7, which is preferably made of glass, when the lid is in its upright position. In another embodiment, the lid has two lateral lid projections 12 that rest in the notches 11 and lie on or close and parallel to the second secant S2. When the lid is lifted from its horizontal lower position into the upright upper position, the lid rotates about the two lid projections 12, which form an axis of rotation. The two lid projections 12 can be welded or glued to or integrally formed on the lid 7. Alternatively, the two lid projections 12 are formed by the two laterally projecting ends of a piece of wire that is attached to the outside of the outer edge of the lid.

The outer stop that is provided for positive guidance of the lid lies on a third secant that is parallel to the above-described first and second secants S1 and S2 and has a greater spacing from the center of the ring 2 than the spacings of the first secant S1 from the ring center.

At least one radially aligned and unillustrated recess, particularly a groove, is formed in the upper edge 4 of the ring as a holder for cooking utensils. Furthermore, a handle 13 is provided off-center on the upper side of the lid. The lid handle 13 is located on the side of the lid facing toward the guest.

The invention claimed is:

1. In combination:
    a cook pot or dish;
    a loose and free lid fittable in a closed position on an upper edge of the cook pot or dish; and
    a holder for securing the lid on the cook pot or dish after the lid has been removed from the closed position, the holder comprising:
    a ring fittable on the upper edge of the cook pot or dish and forming an opening closable by the lid;
    at least one stop-forming support on the ring and that holds the lid on the ring in an upright position with a lower part of an edge of the lid extending down into the opening, and
    a projection on the stop-forming support and extending radially into the ring opening as an inner stop behind which the lower part of the edge of the lid is held.

2. The combination according to claim 1, wherein in its upright position the lid projects with the lower part of its edge into an interior of the serving vessel.

3. The combination according to claim 1, wherein one such projection is provided at each of two spaced-apart points as an inner stop on an inner edge face of the ring.

4. The combination according to claim 1, wherein the projection on the inner edge face of the ring is integrally formed on the ring.

5. The combination according to claim 1, wherein the lower edge of the ring has a lower-edge shape complementary to the upper edge of the serving vessel, and that the upper edge of the ring has an upper-edge shape complementary to the edge of the lid.

6. The combination according to claim 1, further comprising:
    a handle off-center on an upper side of the lid.

7. In combination:
    a cook pot or dish;
    a loose and free lid fittable in a closed position on an upper edge of the cook pot or dish; and
    a holder for securing the lid on the cook pot or dish after the lid has been removed from the closed position, the holder comprising:
    a ring that is fittable on the upper edge of the cook pot or dish, that has two spaced apart-notches on its inner and upper edges in which the lid can be rested with its edge in an upright position, and that forms an opening closable by the lid, and
    at least one stop-forming support on the ring that holds the lid on the ring in the upright position with a lower part of an edge of the lid extending down into the opening; and
    two projections on the lid that extend outward and each rest in a respective one of the notches both when the lid is in a closed position and when it is in the upright position.

8. The combination according to claim 7, wherein the projections are coaxially aligned and extend substantially along an axis extending as a secant of the ring for pivoting of the lid between the closed position and the upright position about the axis.

9. The combination according to claim 8, wherein there are two of the stops defining another axis parallel to the axis of the projections and lying between same and a center of the ring.

* * * * *